US012240708B2

(12) United States Patent
Cavazza et al.

(10) Patent No.: US 12,240,708 B2
(45) Date of Patent: Mar. 4, 2025

(54) TRANSPORT UNIT FOR ARTICLES

(71) Applicant: G.D S.P.A., Bologna (IT)

(72) Inventors: Luca Cavazza, Bologna (IT); Giacomo Noferini, Bologna (IT); Antonio Vitali, Bologna (IT)

(73) Assignee: G.D S.P.A., Bologna (IT)

( * ) Notice: Subject to any disclaimer, the term of this patent is extended or adjusted under 35 U.S.C. 154(b) by 82 days.

(21) Appl. No.: 17/998,791

(22) PCT Filed: Jul. 26, 2021

(86) PCT No.: PCT/IB2021/056715
§ 371 (c)(1),
(2) Date: Nov. 14, 2022

(87) PCT Pub. No.: WO2022/023930
PCT Pub. Date: Feb. 3, 2022

(65) Prior Publication Data
US 2023/0339701 A1 Oct. 26, 2023

(30) Foreign Application Priority Data

Jul. 31, 2020 (IT) .................. 102020000018859

(51) Int. Cl.
*B65G 47/71* (2006.01)
(52) U.S. Cl.
CPC .................................. *B65G 47/71* (2013.01)
(58) Field of Classification Search
None
See application file for complete search history.

(56) References Cited

U.S. PATENT DOCUMENTS

| 4,222,813 A * | 9/1980 | Jodrey ...................... B65C 9/02 |
| | | 198/459.7 |
| 6,347,697 B1 | 2/2002 | Ouellette et al. |
| 7,243,777 B2 * | 7/2007 | Reznik ................. B65G 47/681 |
| | | 198/370.02 |

FOREIGN PATENT DOCUMENTS

| DE | 10 2004 027233 A1 | 12/2005 |
| WO | 2015/009164 A1 | 1/2015 |

OTHER PUBLICATIONS

International Search Report and Written Opinion for International Application No. PCT/IB/2021/056715 filed on Jul. 26, 2021 on behalf of G.D S.P.A. Mail Date: Oct. 8, 2021, 11 pages.

* cited by examiner

*Primary Examiner* — William R Harp
(74) *Attorney, Agent, or Firm* — Steinfl + Bruno LLP

(57) ABSTRACT

A transport unit for moving articles along a conveyor from a first station to a second station is presented. The unit includes a first conveyor segment having entry lanes separated from each other, a second conveyor segment downstream of the first conveyor segment to receive the articles from the first segment and having exit lanes separated from each other, in a number equal to the entry lanes, and a switching device, interposed between the first conveyor segment and the second conveyor segment. The switching device is movable between a first operating configuration, where each entry lane is in communication with a respective exit lane, and at least one second operating configuration, where at least one entry lane is selectively put in communication with an exit lane different from the exit lane with which the at least one entry lane communicates in the first operating configuration.

20 Claims, 4 Drawing Sheets

TRANSPORT UNIT FOR ARTICLES

CROSS REFERENCE TO RELATED APPLICATIONS

The present application is the U.S. National Stage Entry of International Patent Application No. PCT/IB2021/056715, filed on Jul. 26, 2021, which in turn, claims priority to Italian Application No. IT 102020000018859, filed on Jul. 31, 2020.

FIELD

The present invention relates to a unit for transporting articles, particularly configured for use in a production and/or packaging line for said articles.

It is also directed to a method of transporting said articles.

The present invention finds a preferred, though not exclusive, application in the field of the production of loose articles, such as capsules for infusion type products, for example coffee, a field to which reference may be made hereafter without loss of generality.

BACKGROUND

Systems for transporting articles including switching devices between lanes are known in the art.

Such transport systems and the associated switching equipment are typically used in the classification of products, for example by type or quality, or in the distribution of products to different arrival locations.

An example of such a transport and sorting system is described in EP3064456, which relates to a sorting system for a multi-line distribution apparatus that distributes a single line of products to a plurality of lines.

SUMMARY

In this description as well as in the accompanying claims, certain terms and expressions are deemed to have, unless otherwise expressly indicated, the meaning expressed in the following definitions.

The term "article" means any solid product which, within a production and/or industrial packaging line, can be moved along a transport unit.

In particular, the transport unit can be configured to transport these products from a production line to a packaging line.

It should be noted that the term "transport" is intended to include similar expressions of motion, such as transfer, movement, advance or otherwise the movement of a generic object between two positions or between two zones or even between two different operating configurations.

The articles can be identical to each other, or they can differ from each other in some characteristics such as for example the conformation, the composition, the colour or their orientation.

The articles can be, for example, food and confectionery products already packed in individual containers or wrappers, such as coffee capsules or other infusion type beverages, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry.

The term "loose" referring to articles means a plurality of single articles which are separated and not secured to each other, so that each of them can be moved and treated independently of the other articles.

The term "conveyor" means any transport system designed to transfer such articles from one location to another location. The term is intended to include both motorised systems, such as conveyors and chain conveyors, and non-motorised systems, such as idle roller conveyors in motion.

The term "lane" means a portion of the transport unit that allows the transport of articles along a row.

The term "multi-lane transport unit" means a transport unit comprising two or more lanes.

The term "entry lanes" refers to the lanes that are upstream of the switching device; similarly, the expression "exit lanes" means the lanes downstream of the switching device.

The term "switching device" refers to any device apt to move an article from an entry lane to an exit lane other than that which the article would occupy without this device.

The term "stop device" refers to any device apt to stop the transport of the articles along this transport unit, such as an advance barrier.

The Applicant, in the context of the constant need to increase the performance and efficiency of the production and packaging lines, has preliminarily observed that, in a multi-lane transport line of articles, there can be a very variable quantity of articles between the various lanes.

In the present case, the Applicant has noted that such variability between different lanes in the number of articles in each lane could occur in a multi-lane transfer unit placed between a step of production of the articles in a first station and a step of packaging of the articles in a second station. This variability in the number of articles, for example as a result of discarding articles that do not conform to certain specifications, constitutes an important limiting factor in the production capacity.

This limitation is even more critical if there is a further operation on the articles at the end of the transport line, particularly when this operation takes place synchronously on articles coming from different lanes.

This operation could be any operation, such as labelling or further movement of the articles, for example a synchronous picking of such articles, for example for boxing, for which the picking equipment, finding some lanes in a certain advance location devoid of articles and other provided with articles, does not work efficiently.

The Applicant has also noted that in a multi-lane transport unit such variability between lanes in the number of articles in each lane can be critical to the integrity of the same articles. This is the case, for example, if for some reason the articles are blocked along one of the lanes. In the latter case, the motorised conveyor continues to operate and therefore to run to transport the articles between two positions, but the articles do not advance along the lane in which the blockage occurred, accumulating in the segment of lane upstream of the blockage location itself. When the number of accumulated articles exceeds a certain value, these articles, by pressing on each other, may be deformed due to the pressure generated by this accumulation on the articles that are the closest to the blockage. In this case, the damaged articles have to be identified and removed, with a further loss of efficiency of the entire production and/or packaging process.

The Applicant has therefore perceived that the efficiency of a multi-lane transport unit for articles, and more generally of the entire process of production and/or packaging of such articles, can be improved by making the number of articles present in each lane homogeneous among all lanes. Finally, the Applicant has found that, by providing such a multi-lane transport unit with a switching device, it is possible to direct articles from a given lane upstream of this switching device to a different lane downstream of the switching device.

Thanks to this solution, it is possible to homogenise the number of articles in each lane across all lanes, increasing the production capacity and efficiency of the production and/or packaging line.

In a first aspect thereof, therefore, the present invention is directed to a transport unit for articles, provided to move said articles along a conveyor in a movement path from a first station, arranged upstream of the transport unit, to a second station, arranged downstream of the transport unit.

Preferably, said transport unit comprises a first conveyor segment having a plurality of entry lanes in which said articles are transported.

Preferably said entry lanes are separated from each other.

Preferably, said transport unit comprises a second conveyor segment located downstream of said first conveyor segment to receive the articles coming from said first segment.

Preferably said second conveyor segment has a plurality of exit lanes.

Preferably said exit lanes are separated from each other.

Preferably said exit lanes are equal in number to said entry lanes.

Preferably said transport unit comprises a switching device.

Preferably, said switching device is interposed between said first segment and said second conveyor segment.

Preferably, said switching device is movable between a first operating configuration, in which each entry lane is in communication with a respective exit lane, and at least one second operating configuration, in which at least one entry lane is selectively put in communication with an exit lane different from the exit lane with which it is in communication in said first operating configuration.

Thanks to these features, it is possible to make the number of articles in each lane homogeneous between different lanes.

This means that this transport unit can be used effectively in industrial lines where high production capacity and high efficiency are required.

In a second aspect thereof, the present invention relates to a method for making the quantity of articles transported by a multi-lane conveyor on separate lanes homogeneous between the various lanes.

Preferably, the method comprises the step of moving said articles along said first conveyor segment formed by a plurality of entry lanes separated from each other towards a second conveyor segment.

Preferably, the method comprises the step of moving said articles along said second conveyor segment formed by a plurality of exit lanes separated from each other away from said first segment, each of said entry lanes being in communication with a specific exit lane.

Preferably the method comprises the step of detecting a difference in the quantity of articles on two or more of said entry lanes above a certain predetermined threshold.

The person skilled in the art is able to determine the value of this threshold, depending on the type of articles and the specifications of the production and/or packaging plant, as part of normal design activities.

Preferably, the method comprises the step of putting at least one of these entry lanes in communication with a different exit lane by means of a switching device.

In this way, a method is provided which allows the transport of said articles to be managed more effectively and facilitates any subsequent operations.

The present invention, in at least one of the aforesaid aspects, may have at least one of the further preferred features set out below.

In a preferred embodiment, said switching device is controlled so as to move between said first operating configuration and said second operating configuration by a control unit.

In this way, it is possible to eliminate any inhomogeneity between the various lanes in the number of articles present in each lane.

Preferably said control unit is connected to a system for detecting the quantity of articles present in at least one of said entry or exit lanes.

Preferably, said detection system comprises at least one sensor provided to detect the quantity of articles of at least one of said entry or exit lanes.

In one embodiment, said detection system comprises a sensor for each of said entry lanes and/or for each of said exit lanes.

In this case, any inhomogeneity between different lanes in the number of articles present in each lane is determined by the difference between the values detected by said two or more sensors.

Preferably said detection system comprises a plurality of sensors arranged along at least one of said entry or exit lanes.

Preferably, said sensors are arranged equidistant from each other along said at least one of said entry or exit lanes.

Advantageously, this allows, in the case of a blockage of articles along one of the entry or exit lanes, the plurality of sensors to determine when the accumulation of said articles, which is created as a result of the blockage itself, exceeds a certain critical threshold, for example that beyond which there is a deformation of the articles themselves.

The person skilled in the art is able to determine when the accumulation of articles leads to a deformation of the articles in the context of normal design activity.

For example, if said articles are coffee capsules or other infusion type beverages, deformation of the capsules may occur when this accumulation exceeds 5-7 metres.

The person skilled in the art would also choose the spacing between said sensors according to the articles themselves as part of the normal design activity.

Preferably, the spacing between said sensors is chosen in a range between 5 and 10 metres, extremes included.

In one embodiment, said at least one sensor is provided to detect the quantity of articles of at least one of said entry lanes.

Preferably said at least one sensor is chosen from the group consisting of a counting scale, an optical sensor, a magnetic sensor, an inductive sensor, a capacitive sensor and an ultrasonic sensor, more preferably this sensor is an optical sensor, even more preferably this sensor is a photocell comprising an optical source and a receiver.

In one embodiment, said switching device is movable between a number of operating configurations so as to selectively put said at least one of said entry lanes in communication with each of said exit lanes.

If there is an entry lane that systematically has a greater number of articles than the other lanes, this makes it possible to make the number of articles in this lane homogeneous with the number of articles in the other lanes because the switching device is able to distribute the articles from this entry lane to each of the other lanes downstream of the device.

Preferably, said switching device is movable between a number of operating configurations so as to selectively put each one of said entry lanes in communication with each of said exit lanes.

In this way, the number of articles can be made homogeneous between the various lanes, for any of the lanes having a higher or lower number of pieces than the other lanes.

In one embodiment, on at least one of said entry lanes a stop device is provided which is intended to block the movement of said articles along said entry lane upstream of said switching device.

This prevents articles in this lane from coming close to the switching lane and potentially interfering therewith.

Preferably said control unit operates one or more of said stop devices.

In one embodiment, said control unit operates at least one stop device on one of the entry lanes and the switching device is in the operating configuration in which said at least one of the entry lanes, selectively put in communication with an exit lane different from the exit lane with which it is in communication in said first operating configuration, is different from the entry lane on which the at least one stop device acts.

Preferably, a stop device is provided for each of said entry lanes.

This prevents articles from one or more of the entry lanes from coming close to the switching device and potentially interfering therewith.

In one embodiment, said transport unit for articles has two entry lanes.

In one embodiment, said first and second conveyor segments comprise a respective mesh conveyor.

This allows a cleaner transport of the articles themselves; in fact, in case bodies are present outside the article, the meshes of the conveyor allow said bodies to fall from the transporter.

This is especially important for certain sectors, such as the medical and food ones, where particularly high hygiene and health standards are required. Where the article is a coffee capsule or other infusion type beverages, for example, a mesh conveyor allows any coffee or other infusion type beverage powder, present on the outside of the capsule as a result of incorrect filling of the capsule, to fall from the conveyor.

In one embodiment, said switching device comprises a plurality of lateral guides extending between said entry lanes and said exit lanes, said lateral guides being movable relative to said first or said second conveyor segment in order to move said switching device between said first operating configuration and said at least one second operating configuration.

These lateral guides guide the article when moving from said at least one of the entry lanes to an exit lane different from the exit lane with which it is in communication in said first operating configuration.

Preferably said lateral guides are parallel to each other.

In one embodiment, said lateral guides are hinged at one of the two ends. Preferably, all said hinged ends are on the side of said entry lanes or on the side of said exit lanes.

This makes it possible to have a switching equipment that is simpler to operate and less prone to malfunctions that could affect the transport of the articles themselves, as could be the case with a switching device with some lateral guides hinged on the side of the said entry lanes and other lateral guides hinged on the side of the said exit lanes.

In one embodiment, in said first operating configuration each entry lane is in communication with a respective exit lane aligned therewith.

Also this expedient allows to have a simpler design of the switching equipment interposed between said lanes and less prone to malfunctions with respect to the situation in which, in the first operating configuration, said entry lane is not aligned with said exit lane.

In one embodiment, after the step of detecting a difference in the quantity of articles on two or more of said entry lanes or said exit lanes above a certain predetermined threshold, and before putting at least one of said entry lanes in communication with a different exit lane by means of a switching device, there is a step of stopping the movement of said articles along said first conveyor segment.

In this way it is avoided that the articles may reach the switching device when this has not yet put in communication at least one of said entry lanes with a different exit lane.

In one embodiment, after at least one of said entry lanes has been put in communication with a different exit lane by means of said switching device, the movement of articles along said at least one of said lanes on which the switching device has acted is activated, while the movement of the articles in the other entry lanes is kept blocked.

In this way it is avoided that the articles of the lane that has not been put in communicating with a different exit lane can reach the switching device and possibly interfere therewith.

In one embodiment, it is envisaged to stop the movement of said articles along said first conveyor segment after the movement of the articles along said at least one of said lanes on which the switching device has acted has been activated.

In one embodiment, after blocking the movement of said articles along said first conveyor segment subsequent to the activation of the movement of the articles along said at least one of said lanes on which the switching device has acted, it is envisaged to put back each of said entry lanes in communication with the specific exit lane by means of the switching device.

This restores the conveyor's normal arrangement for transporting articles.

In one embodiment, it is envisaged to unblock the movement of said articles along said first conveyor segment after each of said entry lanes has been put back in communication with the specific exit lane.

In this way, the articles can resume being transported by the conveyor in its normal transport arrangement in which each of the said entry lanes is again put in communication with the specific exit lane.

In one embodiment, after the movement of the articles along said at least one of said lanes on which the switching device has acted has been activated, while the movement of the articles in the other entry lanes is kept blocked and before the movement of said articles along said first conveyor segment is blocked, it is provided that a difference in the quantity of articles on two or more of said entry lanes below a certain predetermined threshold is detected. In this way, it is possible to determine when the normal conveyor's arrangement for transporting the articles can be restored, in which each of said entry lanes is again in communication with the specific exit lane.

BRIEF DESCRIPTION OF THE DRAWINGS

The characteristics and advantages of the invention will become clearer from the detailed description below of an embodiment illustrated, by way of non-limiting example, with reference to the appended drawings wherein.

DETAILED DESCRIPTION

Figure 1:
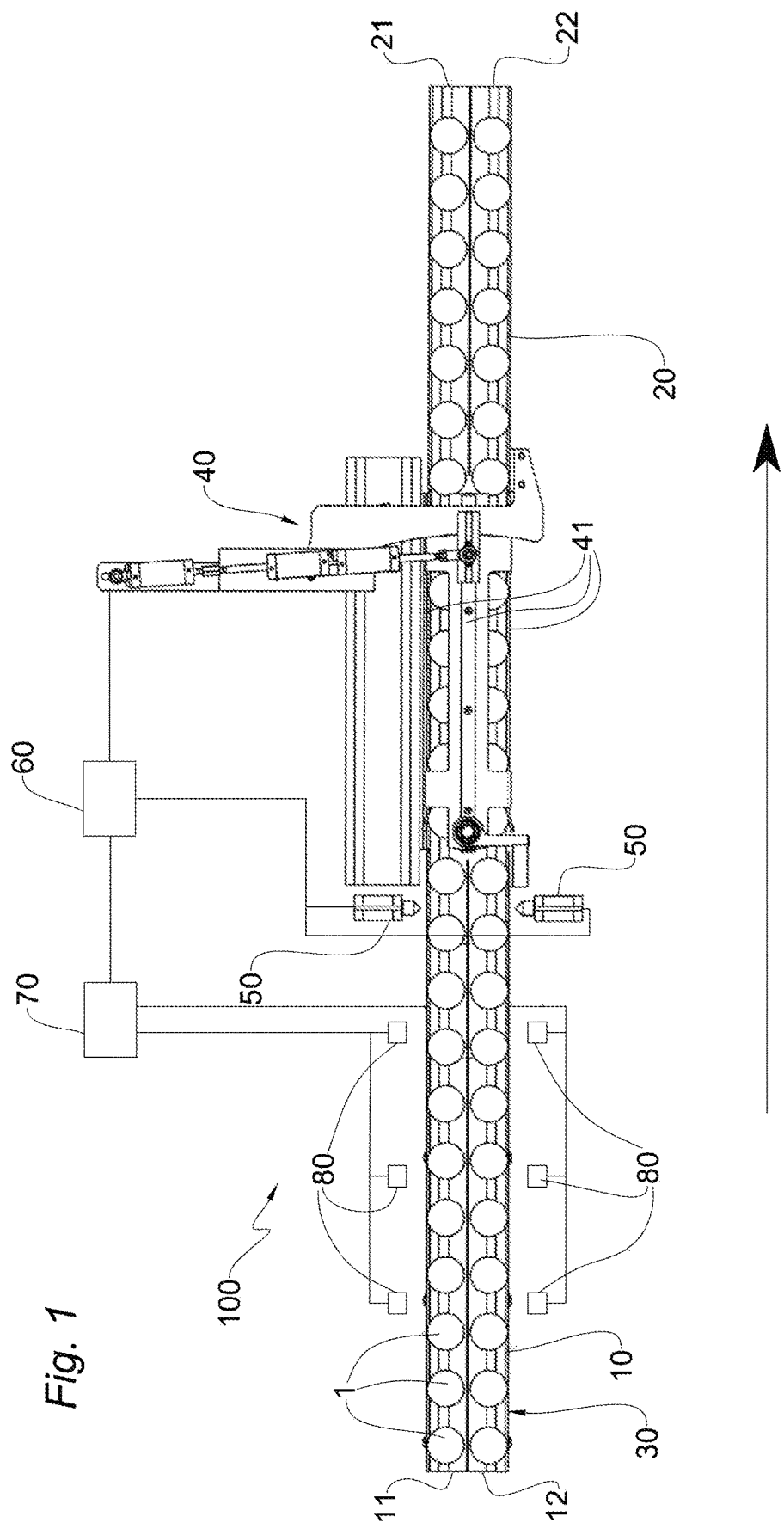
FIG. 1 is a schematic plan view from above of a transport unit for articles made in accordance with the present invention in a first operating configuration.

With reference to the accompanying figures, 100 indicates overall a transport unit constructed in accordance with the present invention.

The transport unit 100 is provided to transport a plurality of articles 1, in bulk, from a first station, also called departure station, to a second station, also called arrival station.

The articles 1 are, in this preferred embodiment example, capsules for the production of infusion type beverages, in particular coffee.

The transport unit 100 comprises, in its most general components, a first conveyor 30 segment 10 and a second conveyor 30 segment 20. The first conveyor 30 segment 10 has a plurality of entry lanes 11, 12, in each of which a row of articles 1 is transported.

The direction of transport of the articles 1 from the first conveyor 30 segment 10 to the second conveyor 20 segment is indicated in FIGS. 1 to 4 by an arrow.

Figure 2:
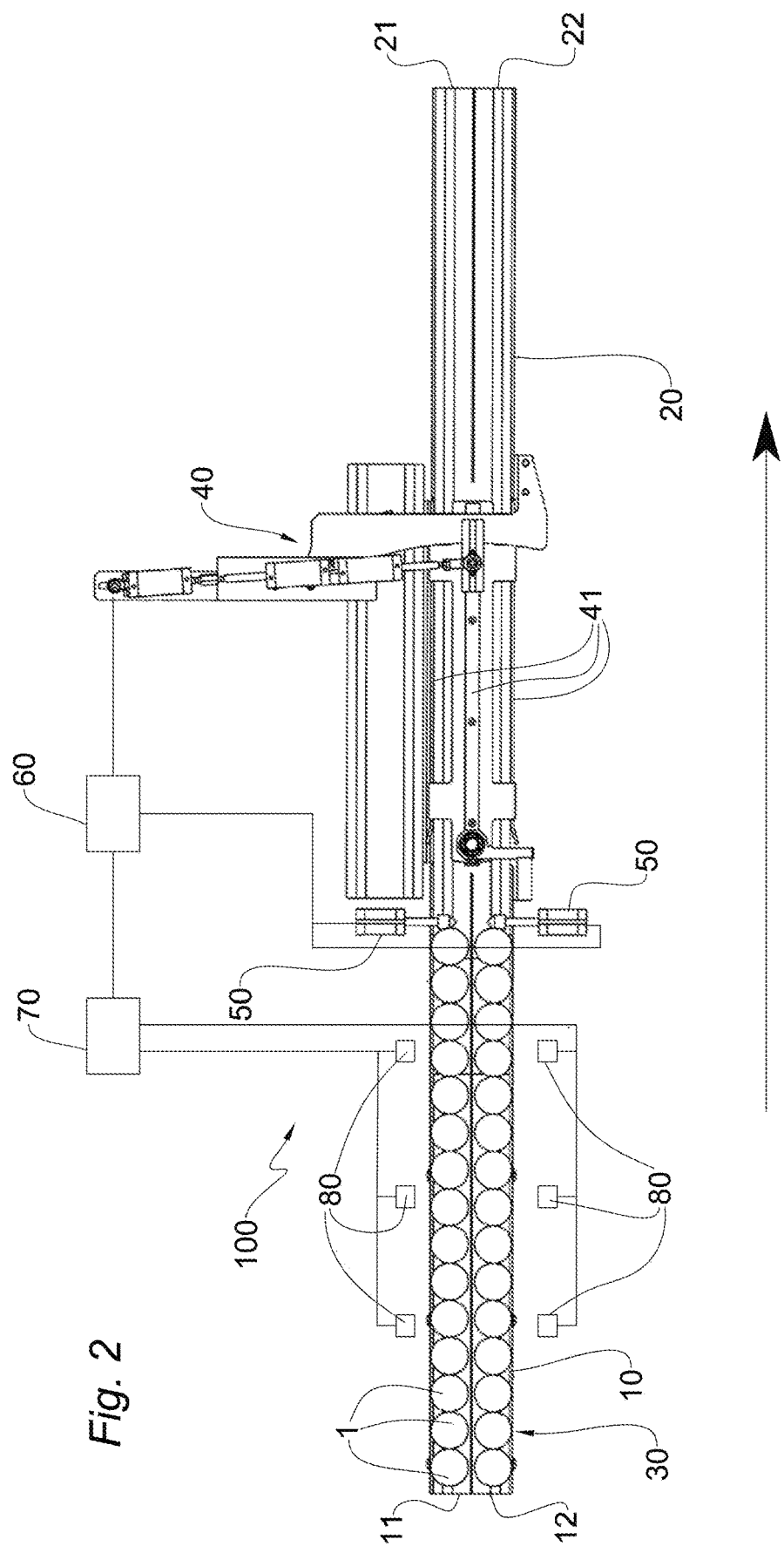
FIG. 2 is a schematic plan view from above of the transport unit of FIG. 1 in a different working position.
Figure 3:
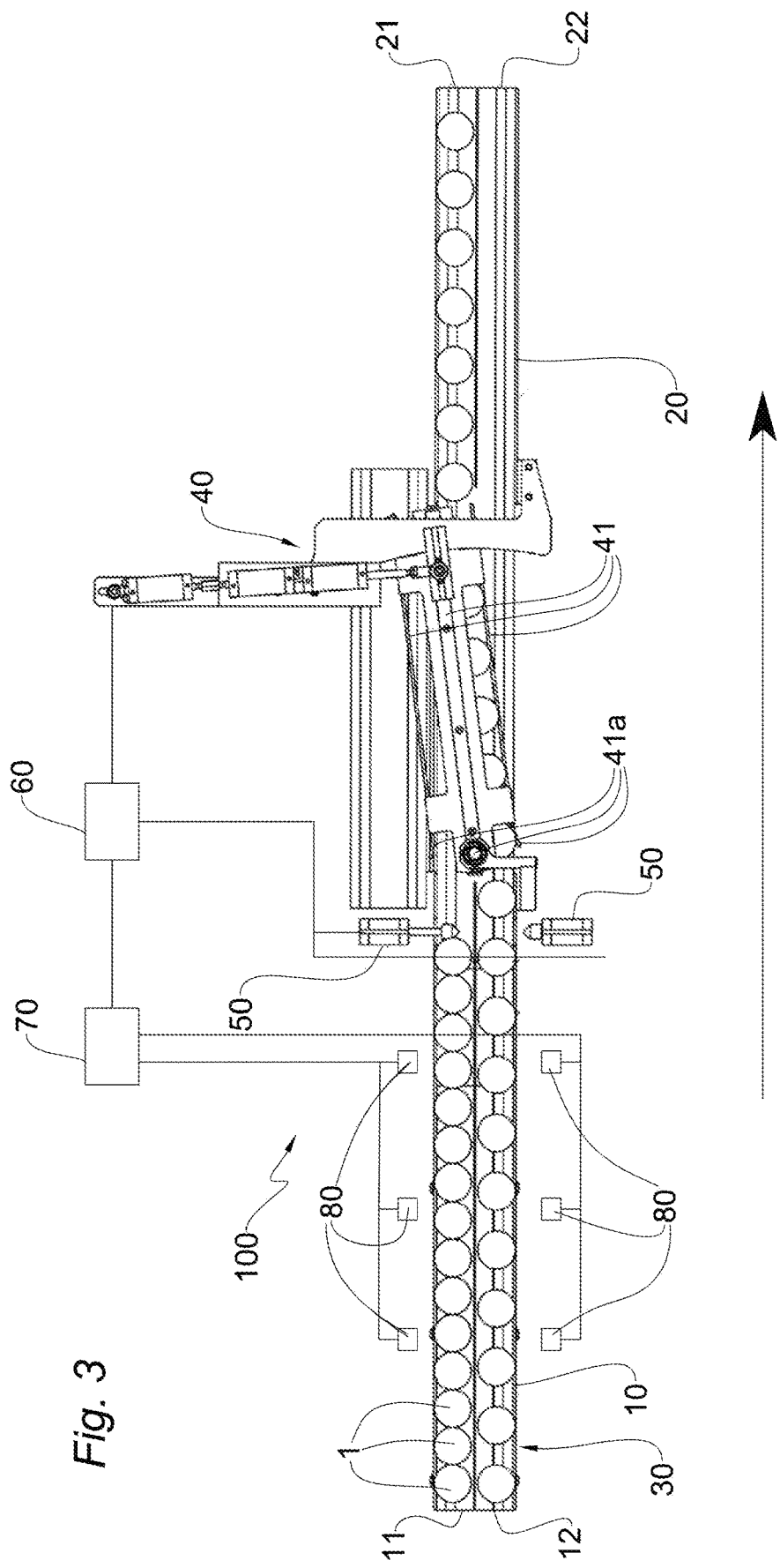
FIG. 3 is a schematic plan view from above of the transport unit for articles from FIG. 1 in a second operating configuration.
Figure 4:
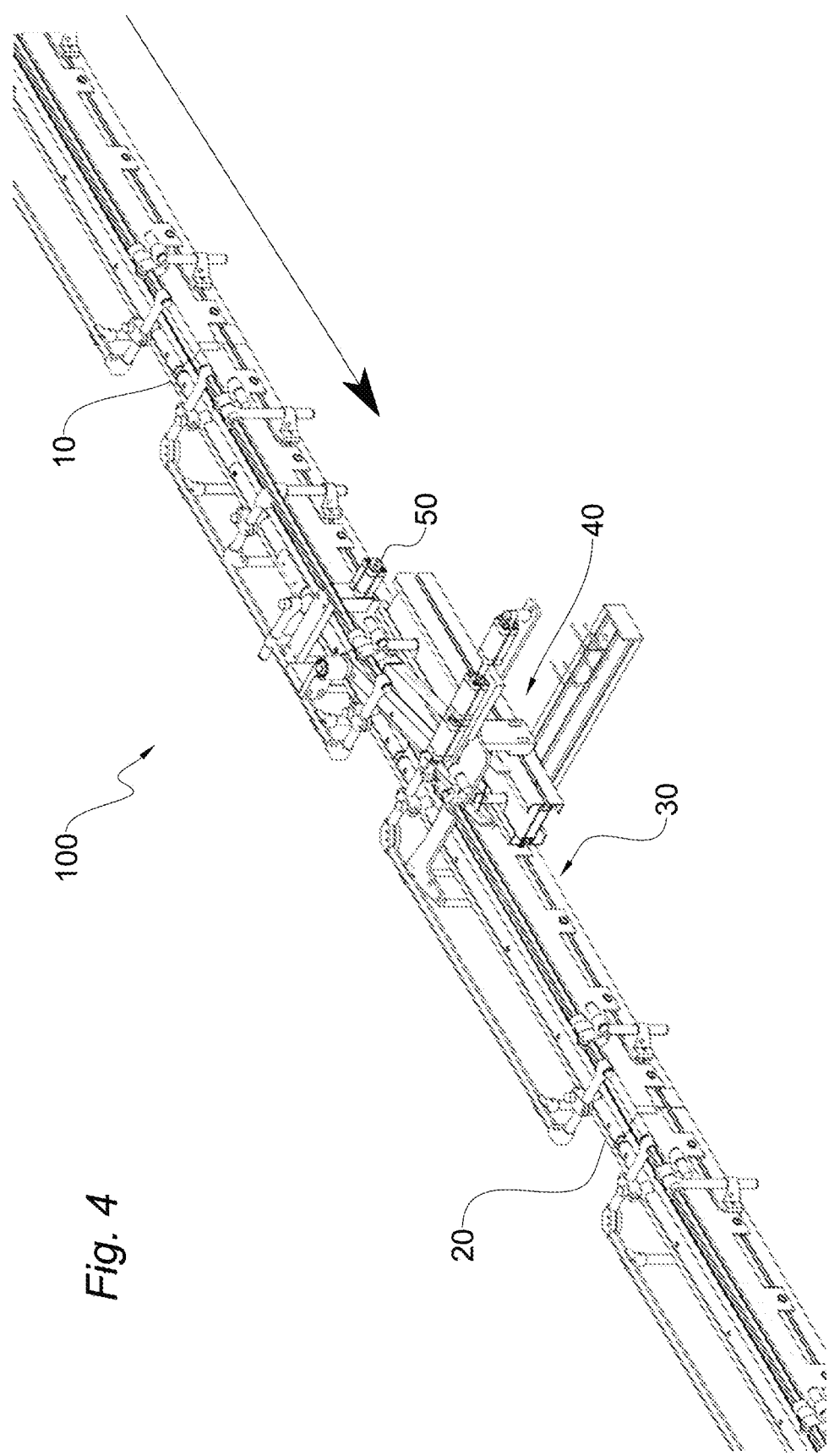
FIG. 4 is a schematic view from above of the transport unit for articles in FIG. 1.

With reference to FIGS. 1 to 3, the entry lanes 11,12 of the transport unit 100 are in number equal to two.

These entry lanes 11,12 are separated from each other, so that articles 1 in a row in an entry lane 11 cannot end up in the neighbouring entry lane 12.

The second conveyor 30 segment 20 has a plurality of exit lanes 21,22, in each of which a row of articles 1 is transported.

With reference to FIGS. 1 to 3, the exit lanes 21,22 of the transport unit 100 are in number equal to two.

These exit lanes 21,22 are separated from each other, so that articles 1 in a row in an exit lane 21 cannot end up in the neighbouring exit lane 22. The transport unit 100 also comprises a switching device 40.

This switching device 40 is movable between a first and at least one second operating configuration.

In the first operating configuration (FIG. 1), each entry lane 11,12 is in communication with a given exit lane 21,22, in particular the entry lane 11 is in communication with the exit lane 21 and the entry lane 12 is in communication with the exit lane 22.

In this way, each article 1 is transported from a given entry lane 11 to a corresponding exit lane 21 and from a given entry lane 12 to a corresponding exit lane 22.

In the second operating configuration, the switching device 40 puts at least one entry lane 11,12 in communication with an exit lane 21,22 different from the exit lane 21,22 with which it is in communication in the first operating configuration.

With particular reference to FIG. 3, in this second operating configuration, the switching device selectively puts the entry lane 12 in communication with the exit lane 21.

In this way, each article 1 is transported from a given entry lane 11 to an exit lane 21.

Similarly, in this second operating configuration, the switching device 40 may selectively put the entry lane 12 in communication with the exit lane 21.

The switching device 40 may be controlled so as to move from the first to at least one second operating configuration by means of a control unit 60 connected to a detection system 70 of the quantity of articles 1 present in at least one of the entry lanes 11,12 or of the exit lanes 21,22.

The detection system 70 may comprise one or more sensors 80 provided to detect the quantity of articles 1 in one of the entry lanes 11,12 or of the exit lanes 21,22.

Each entry lane 11,12 or exit lane 21,22 may have a plurality of sensors 80 arranged along the same lane.

With particular reference to FIGS. 1 to 3, the detection system 70 comprises six sensors 80, three for each of the entry lanes 11,12.

The detection system 70 determines by means of one or more of the sensors 80, when one of the entry lanes 11,12 is found to have a higher quantity of articles 1 than the other entry lanes 11,12 or one of the exit lanes 21,22 is found to have a higher quantity of articles 1 than the other exit lanes 21,22. This inhomogeneity between various entry lanes 11,12 or exit lanes 21,22 in the number of articles 1 present in each entry lane 11,12 or exit lane 21,22 may arise, for example, after a rejection station of non-conforming articles 1. In this case, the control unit 60, connected to the detection system 70, may control the movement of the switching device 40 from a first operating configuration to at least one second operating configuration in such a way as to make the number of articles 1 present in each entry lane 11,12 or exit lane 21,22 homogeneous between various entry lanes 11,12 or exit lanes 21,22. In the case of a two-lane transport unit 100 for articles 1 such as the one in FIGS. 1 to 3, assuming purely by way of example that the entry lane 11 has fewer articles 1 than the entry lane 12, the switching device 40 may be controlled so as to move from a first operating configuration to a second operating configuration such that, the entry lane 12 is selectively put in communication with the exit lane 21, so that the articles 1 are distributed from the entry lane 12 having a higher number of articles 1 to the exit lane 21 having a lower number of articles 1.

The same detection system 70, by means of the same one or more sensors 80, is able to detect when the number of articles 1 present in each entry lane 11,12 or exit lane 21,22 has become homogeneous between the various lanes.

When this occurs, the control unit 60 controls the switching device 40 to move from the second operating configuration to the first operating configuration, in which the entry lane 11 is again put in communication with the corresponding exit lane 21 and the entry lane 12 is again put in communication with the corresponding exit lane 22.

The arrangement of sensors 80 where one or more entry lanes 11,12 or exit lanes 21,22 have a plurality of sensors 80 arranged along the lanes is particularly useful for detecting when, following a blockage of the articles 1 along one of the lanes 11,12,21,22, the articles 1 do not advance, accumulating in the segment of said lane 11,12,21,22 upstream of the blockage location. By arranging a plurality of sensors 80 along a lane 11,12,21,22, the detection system 70 is able to determine when the accumulation of these articles 1 along said lane 11,12,21,22 exceeds a certain threshold, beyond which they undergo deformation.

In this case, the control unit 60, connected to the detection system 70, may control the movement the switching device 40 so that the accumulation of articles 1 in the lane 11,12, 21,22 is interrupted.

If, for example, the accumulation of articles 1 occurs along the exit lane 21, the detection system 70, by means of the plurality of sensors 80 arranged along the exit lane 21, detects this accumulation and the control unit 60 connected thereto controls the switching device 40 to move from a first operating configuration to a second operating configuration in which the entry lane 11 is selectively put in communication with the exit lane 22 in such a way as to interrupt the accumulation of articles 1. The elimination of the accumulation of articles 1, for example as a result of an operator removing the cause of the blockage of the articles 1 in the exit lane 21, or the reduction of the accumulation of the articles 1 in the exit lane 21 below a certain threshold, may be determined by means of the same detection system 70, through the same plurality of sensors 80 arranged along the exit lane 21. When this occurs, the control unit 60 connected thereto controls the switching device 40 to move from the second operating configuration to the first operating configuration, in which the entry lane 11 is again put in communication with the corresponding exit lane 21 and the entry lane 12 is again put in communication with the corresponding exit lane 22.

The transport unit 100 may further comprise stop devices 50. Each stop device 50 stops the transport of the articles on one of the entry lanes 11,12. These stop devices 50 are operated by the control unit 60.

Preferably each entry lane 11, 12 is provided with a stop device.

In the case of a two-lane transport unit 100 for articles 1 such as that in FIGS. 1 to 3, assuming by way of example only that the entry lane 11 has fewer articles 1 than the entry lane 12, the control unit 60, before controlling the switching device 40 to move from a first operating configuration to a second operating configuration such that, the entry lane 12 is selectively put in communication with the exit lane 21, operates each stop device 50 on each of the entry lanes 11,12 so as to completely stop the transport of the articles 1 (FIG. 2). Once the control unit 60 has controlled the movement of the switching device from a first operating configuration to a second operating configuration, it again operates the stop device 50 on the entry lane 12 (FIG. 3), so that the transport of the articles 1 resumes, and in particular that the articles 1 are distributed from the entry lane 12 having a higher number of articles 1 to the exit lane 21 having a lower number of articles 1. In a completely similar manner, the control unit 60, before controlling the switching device 40 to move from the second operating configuration to the first operating configuration, in which the entry lane 11 is again put in communication with the corresponding exit lane 21 and the entry lane 12 is again put in communication with the corresponding exit lane 22, operates the stop device 50 on the entry lane 12 so as to completely stop the transport of the articles 1 (FIG. 2).

Once the control unit 60 has controlled the movement of the switching device from a second operating configuration to a first operating configuration, it again operates the stop devices 50 on the entry lanes 11,12 so that the transport of the articles 1 resumes, and in particular that the articles 1 are distributed from the entry lane 11 to the corresponding exit lane 21 and from the entry lane 12 to the exit lane 22.

The switching device 40 comprises a plurality of lateral guides 41 extending between the entry lanes 11,12 and the exit lanes 21,22.

These lateral guides 41 are movable relative to the first segment 10 or the second conveyor 30 segment 20 in order to move the switching device 40 between a first operating configuration and at least one second operating configuration.

Furthermore, these lateral guides 41 are apt to guide the articles 1 through the switching device 40 itself.

With reference to FIGS. 1 to 3, for a two-lane transport unit 100 for articles 1, the lateral guides 41 are 3 in number.

With reference to FIGS. 1 to 3, the lateral guides 41 are parallel to each other.

In particular, the lateral guides 41 can be hinged at one of the two ends. With reference to FIG. 3, the lateral guides 41 are all hinged at one end thereof 41a on the side of the entry lanes 11,12.

In the case of a two-lane transport unit 100 for articles 1 such as the one in FIGS. 1 to 3, assuming purely by way of example that the entry lane 11 has fewer articles 1 than the entry lane 12, the control unit 60 controls the switching device 40 to move from a first to a second operating configuration such that the entry lane 12 is selectively put in communication with the exit lane 21, by moving the lateral guides 41, hinged at one end thereof 41a on the side of the entry lanes 11,12.

Similarly, the control unit 60 controls the switching device 40 to move from a second to a first operating configuration such that, each entry lane 11 is put in communication with the corresponding exit lane 21 and each entry lane 12 is put in communication with the corresponding exit lane 22, by reverse movement of the lateral guides 41, hinged at one end thereof 41a on the side of the entry lanes 11,12.

It goes without saying that a person skilled in the art may, in order to meet specific and contingent application requirements, make further modifications and variants of the above-described invention within the scope of protection as defined by the following claims.

The invention claimed is:

1. A transport unit for articles, configured to move said articles along a conveyor in a movement path from a first station, arranged upstream of the transport unit, to a second station, arranged downstream of the transport unit, the transport unit comprising:
a first conveyor segment having entry lanes, separated from each other, where said articles are to be transported,
a second conveyor segment located downstream of said first conveyor segment to receive said articles coming from said first conveyor segment, said second conveyor segment having exit lanes, separated from each other, in a number equal to said entry lanes,
a switching device interposed between said first conveyor segment and said second conveyor segment and movable between a first operating configuration, in which each entry lane is in communication with a respective exit lane, and at least one second operating configuration, in which at least one entry lane is selectively put in communication with an exit lane different from the exit lane with which the at least one entry lane is in communication in said first operating configuration;
a control unit configured to control said switching device so as to move between said first operating configuration and said second operating configuration, and
a detection system connected to the control unit, for detecting a quantity of articles present in at least one of said entry lanes or exit lanes.

2. The transport unit for articles according to claim 1, wherein said detection system comprises at least one sensor configured to detect the quantity of articles of at least one of said entry lanes or exit lanes.

3. The transport unit for articles according to claim 2, wherein said sensor is located for each of said entry lanes and/or for each of said exit lanes.

4. The transport unit for articles according to claim 2, wherein said at least one sensor is configured to detect the quantity of articles of at least one of said entry lanes.

5. The transport unit for articles according to claim 1, wherein said detection system comprises sensors arranged along said at least one of said entry lanes or exit lanes.

6. The transport unit for articles according to claim 1, wherein said switching device is movable between a number of operating configurations to selectively put said at least one of said entry lanes in communication with each of said exit lanes.

7. The transport unit for articles according to claim 6, wherein said switching device is movable between a number of operating configurations to selectively put each of said entry lanes in communication with each of said exit lanes.

8. The transport unit for articles according to claim 1, further comprising:
a stop device on at least one of said entry lanes, configured to block movement of said articles along said entry lane upstream of said switching device.

9. The transport unit for articles according to claim 8 comprising a control unit configured to operate one or more of said stop devices.

10. The transport unit for articles according to claim 9, wherein:
said control unit operates said at least one stop device on one of said entry lanes and
said switching device is in the at least one second operating configuration in which said at least one of the entry lanes, selectively put in communication with an exit lane different from the exit lane with which the at least one entry lane is in communication in said first operating configuration, is different from an entry lane on which the at least one stop device acts.

11. The transport unit for articles according to claim 8, wherein the stop device is provided for each of said entry lanes.

12. The transport unit for articles according to claim 1, wherein in said first operating configuration each entry lane is in communication with a related exit lane aligned therewith.

13. A transport unit for articles, configured to move said articles along a conveyor in a movement path from a first station, arranged upstream of the transport unit, to a second station, arranged downstream of the transport unit, the transport unit comprising:
a first conveyor segment having entry lanes, separated from each other, where said articles are to be transported,
a second conveyor segment located downstream of said first conveyor segment to receive said articles coming from said first conveyor segment, said second conveyor segment having exit lanes, separated from each other, in a number equal to said entry lanes, and
a switching device interposed between said first conveyor segment and said second conveyor segment and movable between a first operating configuration, in which each entry lane is in communication with a respective exit lane, and at least one second operating configuration, in which at least one entry lane is selectively put in communication with an exit lane different from the exit lane with which the at least one entry lane is in communication in said first operating configuration,
wherein:
said switching device comprises lateral guides parallel to each other and extending between said entry lanes and said exit lanes, and
said lateral guides are movable relative to said first conveyor segment or said second conveyor segment in order to move said switching device between said first operating configuration and said at least one second operating configuration.

14. The transport unit according to claim 13, wherein said lateral guides have two ends and are hinged at one of the two ends.

15. The transport unit according to claim 14, wherein the ends at which the lateral guides are hinged are all on a side of said entry lanes or all on a side of said exit lanes.

16. A method to homogenize quantities of articles transported by a multi-lane conveyor in separate lanes among various lanes, comprising the following steps of:
a) moving said articles along a first conveyor segment formed by entry lanes, separated from each other, towards a second conveyor segment;
b) moving said articles along said second conveyor segment, said second conveyor segment being formed by exit lanes separated from each other, away from said first segment, wherein each of said entry lanes is in communication with a specific exit lane;
c) detecting a difference in quantity of articles on two or more of said entry lanes or of said exit lanes that is above a certain predetermined threshold; and
d) putting at least one of said entry lanes in communication with a different exit lane by a switching device.

17. The method according to claim 16, further comprising the step of:
e) blocking the movement of said articles along said first conveyor segment, said step e) being after said step c) and before said step d).

18. The method according to claim 17, comprising the step of:
f) activating the movement of the articles along at least one of said entry lanes of step
d) while keeping the movement along other entry lanes blocked, said step f) being after said step d).

19. The method according to claim 18, comprising the steps of:
g) blocking the movement of said articles along said first conveyor segment;
h) putting each of said entry lanes back in communication with the specific exit lane by said switching device; and
i) releasing the movement of said articles along said first conveyor segment, after said step f).

20. A transport unit for articles, configured to move said articles along a conveyor in a movement path from a first station, arranged upstream of the transport unit, to a second station, arranged downstream of the transport unit, the transport unit comprising:
a first conveyor segment having entry lanes, separated from each other, where said articles are to be transported,
a second conveyor segment located downstream of said first conveyor segment to receive said articles coming from said first conveyor segment, said second conveyor segment having exit lanes, separated from each other, in a number equal to said entry lanes,
a switching device interposed between said first conveyor segment and said second conveyor segment and movable between a first operating configuration, in which each entry lane is in communication with a respective exit lane, and at least one second operating configuration, in which at least one entry lane is selectively put in communication with an exit lane different from the exit lane with which the at least one entry lane is in communication in said first operating configuration;

a stop device on at least one of said entry lanes, configured to block movement of said articles along said entry lane upstream of said switching device; and a control unit configured to operate one or more of said stop devices, wherein said control unit operates said at least one stop device on one of said entry lanes and said switching device is in the at least one second operating configuration in which said at least one of the entry lanes, selectively put in communication with an exit lane different from the exit lane with which the at least one entry lane is in communication in said first operating configuration, is different from an entry lane on which the at least one stop device acts.

\* \* \* \* \*